H. H. MOENKHAUS.
COOLING RECEIVER FOR COFFEE ROASTERS.
APPLICATION FILED MAR. 7, 1921.
1,389,964.
Patented Sept. 6, 1921.
2 SHEETS—SHEET 1.
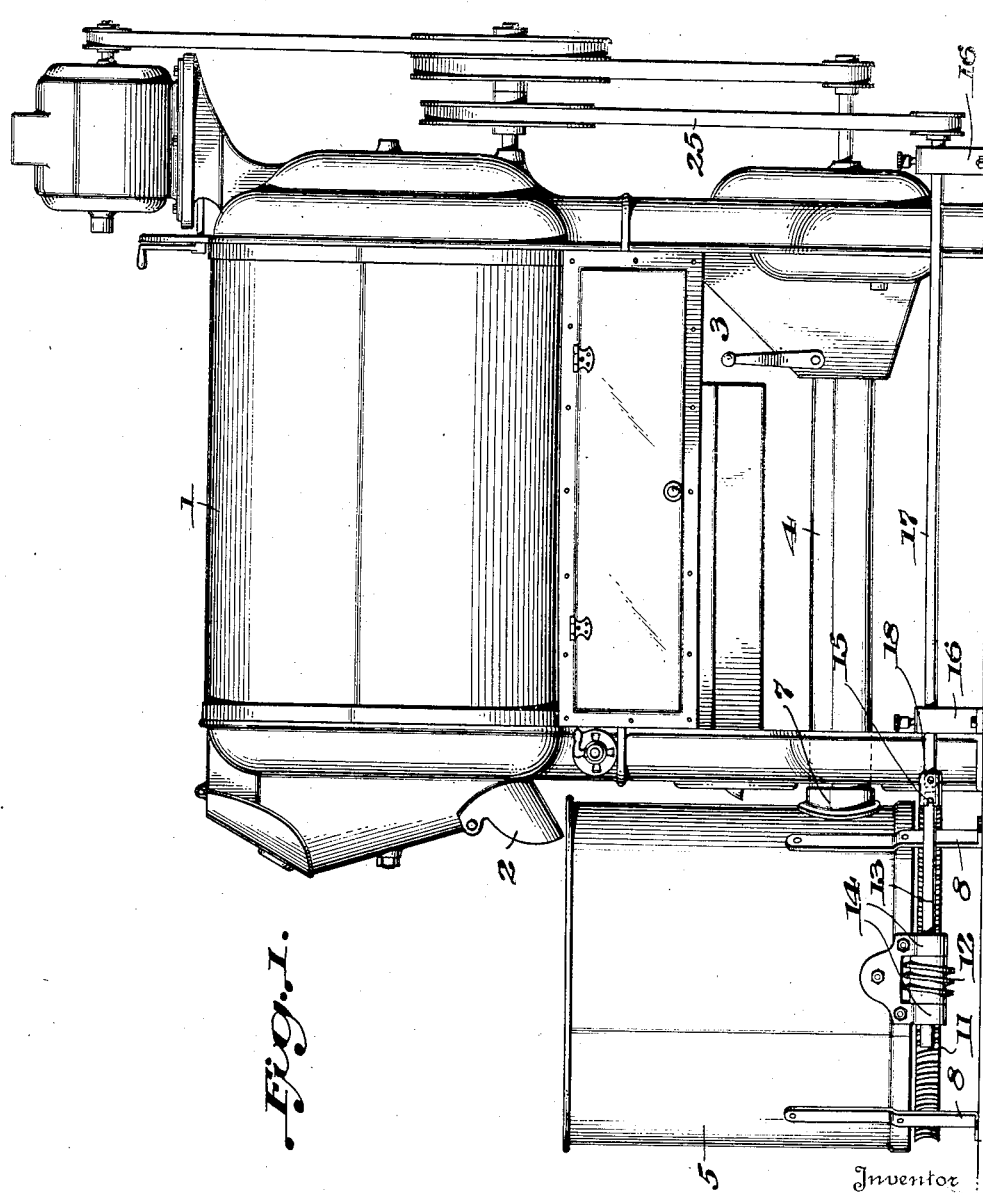

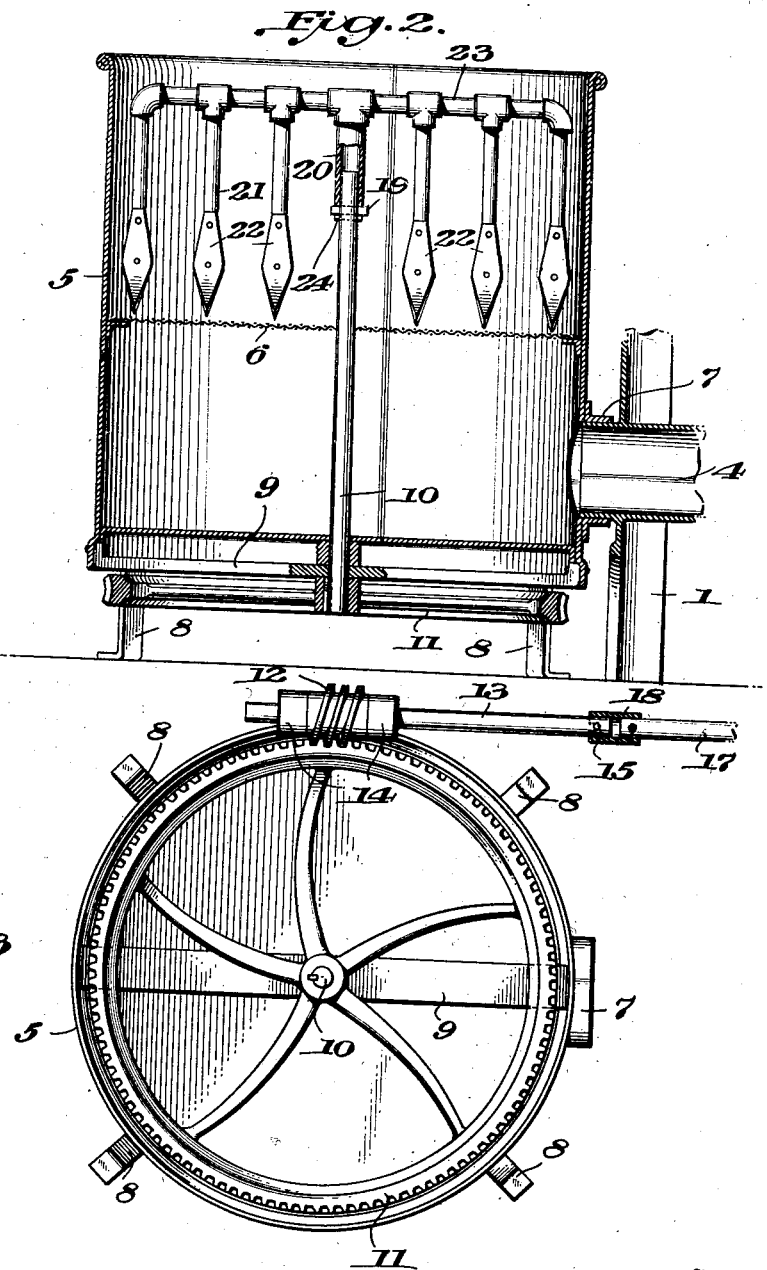

UNITED STATES PATENT OFFICE.

HENRY H. MOENKHAUS, OF EVANSVILLE, INDIANA.

COOLING-RECEIVER FOR COFFEE-ROASTERS.

1,389,964.  Specification of Letters Patent.  Patented Sept. 6, 1921.

Application filed March 7, 1921. Serial No. 450,455.

*To all whom it may concern:*

Be it known that HENRY H. MOENKHAUS, a citizen of the United States, residing at Evansville, in the county of Vanderburgh and State of Indiana, has invented certain new and useful Improvements in Cooling-Receivers for Coffee-Roasters, of which the following is a specification.

This invention relates to cooling receivers for coffee roasters, particularly those roasters which are used in retail stores for the purpose of furnishing fresh roasted coffee to the buyer.

Heretofore a complete coffee roasting equipment commonly used for the purpose specified has comprised a roasting machine and a receiving bin or car mounted on legs and provided with a screen bottom and a pipe coupling, the receiver being adapted to be applied to the coffee roaster in position to receive the roasted coffee issuing from the chute of the roaster and being coupled to the air suction means of the roaster. The air suction means draws the air down through the coffee supported on the screen in the receiver for the purpose of cooling the coffee.

The receivers or cars such as above described are detachable so that they may be removed, with their contents, to any desired point. Heretofore it has been necessary to stir the roasted coffee by any suitable means, such as a stick, spoon, or the like, to prevent it from burning and fusing or sticking together because it is very hot when it issues from the roaster and it has been found that the suction cooling means of the roaster is inadequate to prevent the foregoing action.

My invention overcomes all possibility of the coffee sticking or burning when in the cooling receiver and it obviates the necessity of stirring the coffee by hand; resulting in a superior product, minimizing loss, and facilitating handling without having to resort to the time and labor of an operator for stirring the coffee.

My invention embodies a self-contained cooling receiver which has, in addition to the screening heretofore used for supporting the coffee, improved stirring means, and detachable operating means for said stirring means, said operating means being driven by any suitable countershaft carried by the roaster or by the support on which it stands and driven from the pulley or the roaster, or otherwise. My improved stirrer is detachable from its shaft in order to allow easy access to the bin or receiver when emptying it. The detachable connection is simple and comprises parts which clutch together or unclutch quite readily. The stirrer is turned, at a suitable speed, inside the receiver and above the screen to suitably agitate the coffee, by gearing and a shaft which, preferably, embodies a large worm wheel or gear carried by the shaft of the stirrer and a worm meshing therewith which is carried by a shaft mounted in a suitable bracket on the receiver and provided with means whereby it may be quickly and easily coupled to or uncoupled from a countershaft driven by the roaster, or otherwise.

While I have shown and described the invention in connection with a coffee roaster which is well known commercially, it is to be understood that its use is not restricted to that particular roaster as the invention resides in a self-contained cooling receiver having stirring means for moving, stirring, or agitating the contents of the receiver, and the receiver is adapted to be connected to, and comprises an improved combination with, a coffee roaster; means being provided for detachably connecting the receiver to driving means and to the air suction means of the roaster.

I am also aware that modifications may be resorted to in the gearing, stirrer, and other parts entering into the operative devices which are adapted to effect stirring. The disclosure of the invention in the specification and drawings is, therefore, to be considered illustrative instead of restrictive, of the scope of the invention.

In the accompanying drawings:

Figure 1, is a side elevation of my invention, shown applied to a coffee roaster;

Fig. 2, is a vertical section through the cooling receiver and certain parts of the roaster; and Fig. 3, is a bottom view of the cooling receiver.

At 1 there is shown a coffee roaster which is commercially well known and is designed to be used in stores to roast coffee fresh from time to time. This roaster is provided with an outlet 2 from which the roasted coffee flows into a receiving bin or car which, as heretofore constructed, has simply comprised a receptacle provided with a screen bottom for supporting the coffee. The roaster is provided with a suction fan 3 having the pipe 4 adapted to couple to the receiving bin so that air will be drawn down through the coffee supported on the screen for the purpose of cooling it. In practice, however, it is found that unless the coffee in the bin or receiver is stirred as by the use of a stick or spoon, the coffee beans burn or stick together and this results in loss and an inferior product. Consequently it has been necessary for an attendant to stir the coffee in the receiver which means an additional expense in the operation of the machine.

My improvements do away with danger of burning of the coffee and the sticking together of the beans.

The receiver 5 is preferably cylindrical so that there will be no corners to arrest the coffee and prevent it from being kept in motion. The usual screen 6 is provided for supporting the coffee and below this screen is an air chamber having a coupling 7 adapted to detachably couple to the pipe 4. The receiver is supported by suitable legs 8 which may, if desired, be provided with casters or wheels.

Extending across the bottom of the receiver is a bar 9 in which is journaled an upright shaft 10 whose upper end extends above the screen 6 and whose lower end carries a large worm wheel or gear 11. The worm wheel 11 is driven by a worm 12 carried by a shaft 13 journaled in bearings 14 on the receiver 5. The shaft 13 is provided with a cross pin 15 set back from its end. Mounted in suitable bearings 16 on the floor of the roaster 1 is a countershaft 17 which has a slotted clutch head 18 adapted to receive the end of the shaft 13 for the purpose of coupling to the cross pin 15. Consequently, the receiver 5 may be quickly and easily coupled to the shaft 17 and the pipe coupling 7 may be readily connected to the pipe 4, or, these parts may be quickly disconnected.

The upper end of the shaft 10 is provided with a pin 19 and said shaft end is adapted to receive the slotted hollow part 20 of a stirrer 21 which has stirring shovels or arms 22 depending from a cross head 23. The stirrers or shovels 22 may be of any suitable form and they reach sufficiently low so as to be relatively close to the screen and yet clear it. The entire stirrer 21 is adapted to slip down over the upper end of the shaft 10 and to couple thereto by the reception of the pin 19 in the cross slot 24. This construction permits the entire stirrer to be quickly and easily detached from the shaft 10 whenever it is desired to have access to the bin as, for instance, when emptying it.

The countershaft 17 is suitably driven from a drive shaft of the roaster by any means, for instance a belt and pulley 25, but said shaft may be otherwise driven.

The turning of the stirrer 21 in the coffee which is supported on the screen keeps the coffee in movement and prevents the beans from burning on account of their heat and from sticking together and yet no attendant's services are required. Immediately the receiver is disconnected from the countershaft 17 and the pipe 14 by moving said receiver away, rotation of the stirrer ceases and the contents of the receiver may then be quickly gotten out.

I claim:

1. The combination with a coffee roaster, of a self-contained or unitary cooling receiver or bin having a screen for supporting the coffee, means whereby air may be drawn down through the coffee and through the screen, a stirrer for stirring the coffee, and driving means for the stirrer.

2. The combination with a coffee roaster, of a self-contained or unitary cooling receiver or bin having a screen for supporting the coffee, means whereby air may be drawn down through the coffee and through the screen, a stirrer for stirring the coffee, and driving means for the stirrer, said driving means and cooling means being adapted for detachable connection to a drive shaft and a suction pipe when the receiver or bin is in position for receiving coffee from the roaster.

3. A self-contained or unitary stirring and cooling receiver or bin having a screen for supporting the material, an air chamber below the screen, a pipe coupling for the air chamber, a stirrer operating above the screen, and means for operating said stirrer.

In testimony whereof I affix my signature.

HENRY H. MOENKHAUS.